US007954674B2

(12) United States Patent
Roy et al.

(10) Patent No.: US 7,954,674 B2

(45) Date of Patent: Jun. 7, 2011

(54) PUMP FOR DELIVERING A FLUID PRODUCT

(75) Inventors: Christophe Roy, Dieppe (FR); Yohann Langlois, Feuquieres En Vimeu (FR)

(73) Assignee: Rexam Dispensing Systems S.A.S. (FR)

( * ) Notice: Subject to any disclaimer, the term of this patent is extended or adjusted under 35 U.S.C. 154(b) by 349 days.

(21) Appl. No.: 11/940,548

(22) Filed: Nov. 15, 2007

(65) Prior Publication Data

US 2008/0118368 A1 May 22, 2008

(30) Foreign Application Priority Data

Nov. 16, 2006 (FR) ..................................... 06 10044

(51) Int. Cl.
*G01F 11/10* (2006.01)
*F04B 53/14* (2006.01)

(52) U.S. Cl. .................. 222/321.6; 417/547; 222/321.8; 222/378; 222/383.3

(58) Field of Classification Search .................. 417/547, 417/472; 222/321.6, 321.7, 321.8, 321.9, 222/377, 378, 381, 383.1, 383.3, 385
See application file for complete search history.

(56) References Cited

U.S. PATENT DOCUMENTS 3,949,906 A * 4/1976 Pettersen et al. ......... 222/153.13
4,434,916 A * 3/1984 Ruscitti et al. ............ 222/321.9
4,986,453 A * 1/1991 Lina et al. .................. 222/321.2
5,147,073 A * 9/1992 Cater ......................... 222/321.9
5,217,148 A * 6/1993 Cater ......................... 222/321.2
5,401,148 A * 3/1995 Foster et al. .................. 417/547
5,443,569 A 8/1995 Uehira et al.
5,570,819 A 11/1996 Uehira et al.
5,850,948 A * 12/1998 Garcia et al. ............... 222/321.9
6,045,008 A 4/2000 González Fernández et al.
6,237,814 B1 * 5/2001 Blyler et al. ............. 222/189.09
6,398,079 B1 6/2002 Garcia et al.
6,415,959 B1 7/2002 Bougamont et al.
6,446,840 B2 9/2002 Ophardt et al.
6,824,022 B2 * 11/2004 Marelli ...................... 222/321.9
7,497,356 B2 * 3/2009 Beranger et al. ........... 222/321.2
2004/0069811 A1 * 4/2004 Perignon et al. ........... 222/321.7

FOREIGN PATENT DOCUMENTS

DE 10108299 A1 1/2002
EP 0953381 A2 11/1999
FR 2784717 A1 4/2000
FR 2792553 A1 10/2000
WO 9713585 A1 4/1997

OTHER PUBLICATIONS

French Search Report, Jul. 13, 2007, 3 Pages.

* cited by examiner

*Primary Examiner* — Devon C Kramer
*Assistant Examiner* — Leonard J Weinstein
(74) *Attorney, Agent, or Firm* — St. Onge Steward Johnston & Reens LLC

(57) ABSTRACT

A pump comprising a tubular body delimiting internally a metering chamber and comprising an inlet orifice, an inlet valve, a stem mounted so as to be able to move inside the body and comprising an actuation tube delimiting an outlet duct, an insert assembled to the actuation tube and comprising a base placed inside the metering chamber and facing the inlet orifice, and a discharge orifice, an annular piston mounted so as to slide inside the body and on the stem, the piston and the base comprising annular surfaces suitable for forming a discharge valve, a ball-and-socket joint being arranged between the insert and the actuation tube.

10 Claims, 4 Drawing Sheets

FIG. 1
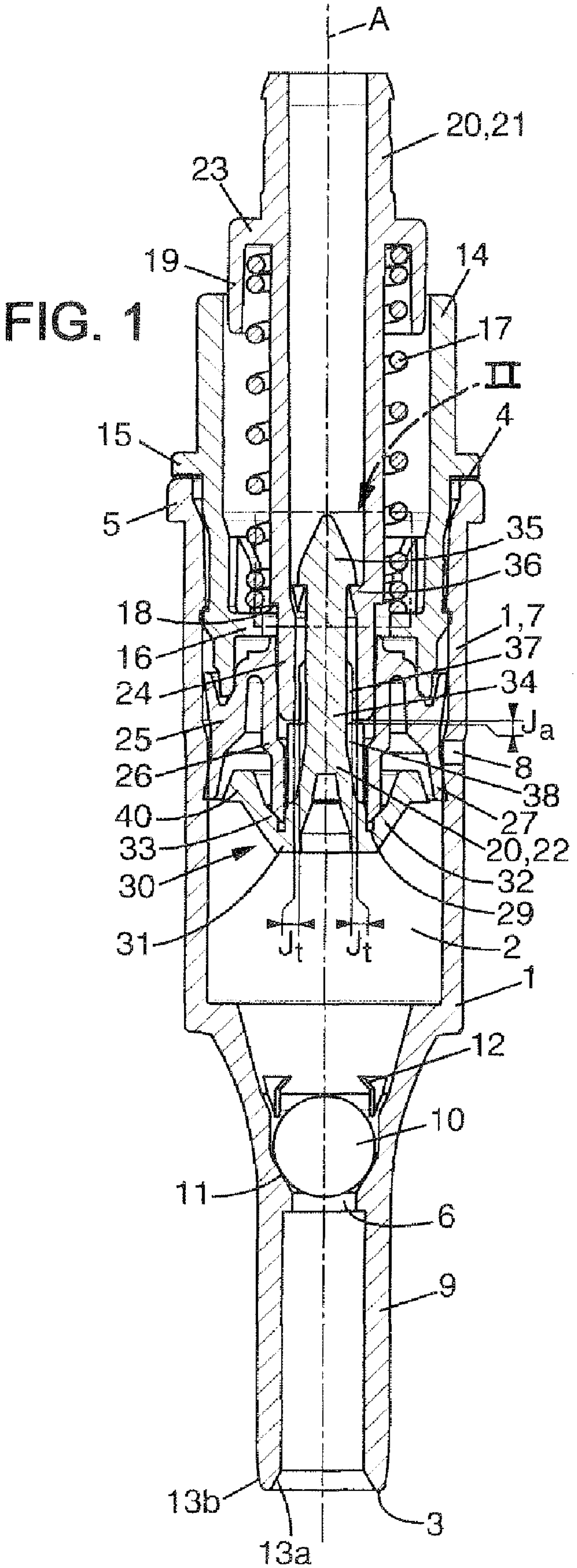
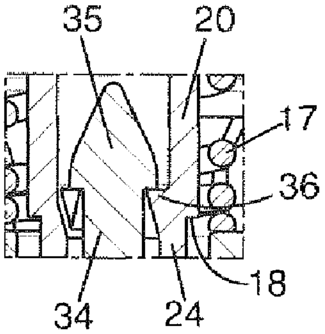
FIG. 2

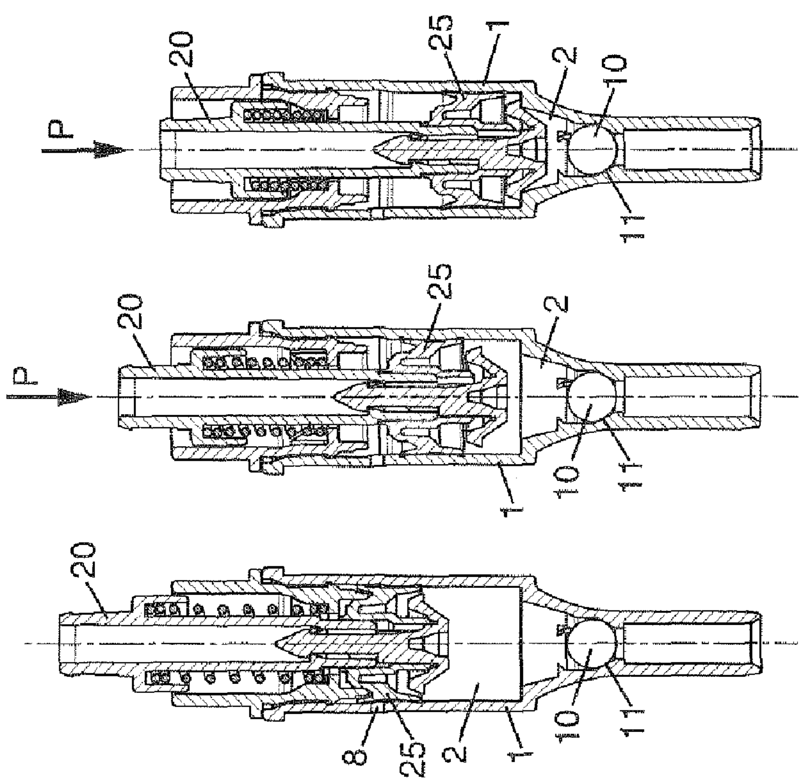
FIG. 5a FIG. 5b FIG. 5c
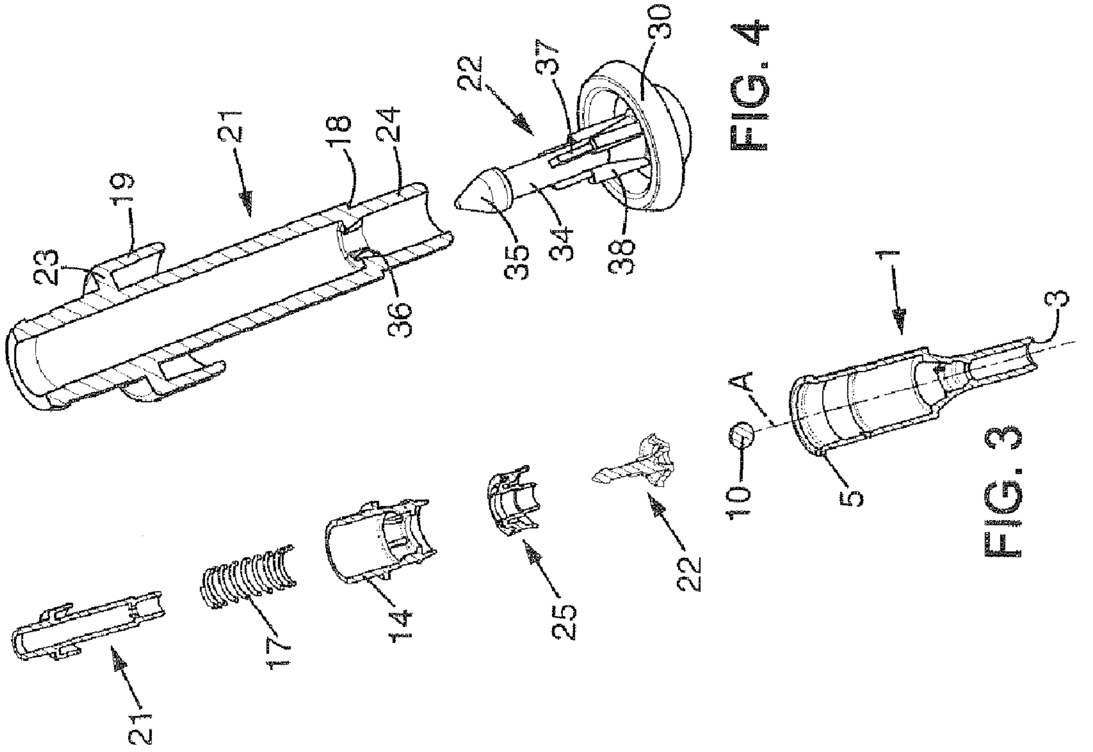
FIG. 4
FIG. 3

FIG. 6
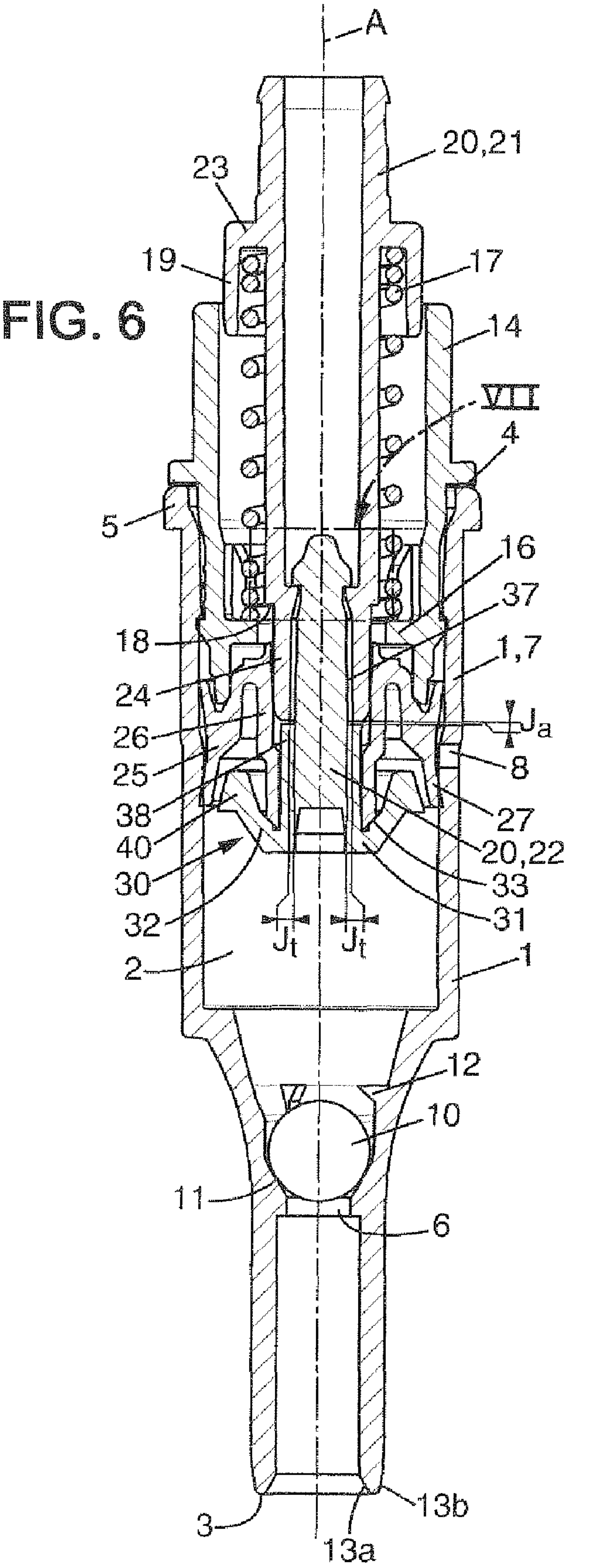
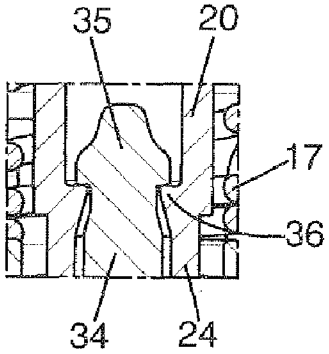
FIG. 7

PUMP FOR DELIVERING A FLUID PRODUCT

CROSS-REFERENCE TO RELATED APPLICATIONS

The present application claims priority of French patent application No. 06 10044 filed on Nov. 16, 2006, the content of which is incorporated herein by reference.

FIELD OF THE INVENTION

The invention relates to a pump for delivering a fluid product.

More particularly, the invention relates to a pump for delivering a fluid product comprising a tubular body extending along a central axis between a first end and a second end, delimiting internally a metering chamber and comprising an inlet orifice for the fluid product in the metering chamber in the vicinity of said first end, an inlet valve suitable for selectively closing off the inlet orifice, a stem mounted so as to be able to move axially inside the body between a far position and a near position relative to the inlet orifice, said stem being returned elastically to the far position, said stem comprising an elongated axial actuation tube delimiting an outlet duct, an elongated insert assembled to the actuation tube and comprising a base placed inside the metering chamber and facing the inlet orifice, and an orifice for discharging the fluid product to the outlet duct, an annular piston mounted so as to slide axially inside the body and on the stem, the piston and the base comprising annular surfaces for coming into mutual contact and forming a discharge valve selectively closing off the discharge orifice.

BACKGROUND OF THE INVENTION

Such an embodiment of the stem in two assembled parts, namely the insert and the actuation tube, is intended to allow the mounting of the piston on the stem, for example when said stem is provided with shoulders facing the base particularly for limiting the stroke of the piston or for forming a seat for an elastic member suitable for returning the stem to the far position.

In a known pump of the aforementioned type, the insert is rigidly attached to the actuation tube, by sleeve-fitting by force or other means.

Such a pump poses problems in terms of fabrication because it requires a precise relative positioning of the insert and of the actuation tube and requires the insert and the actuation tube to be manufactured with reduced tolerances.

In addition, the known pump has piston sealing and wear problems. Specifically, such a pump may have an angular offset between the insert and the actuation tube. As a result, the piston cannot exert a distributed pressure on the inside of the body which adversely affects the sealing and increases the risks of premature wear of the piston. And the annular surfaces of the base and of the piston cannot come into contact in a uniform manner. The result of this is a lack of sealing of the discharge valve and a risk of wear of the piston surfaces.

SUMMARY OF THE INVENTION

The object of the invention is to alleviate the problems mentioned above.

Accordingly, the invention proposes a pump of the aforementioned type in which a ball-and-socket joint is arranged between the insert and the actuation tube.

Therefore, the ball-and-socket joint allows easier assembly and manufacture of the insert and of the actuation tube. In addition, it makes it possible to obtain a centering and a self-alignment between the insert and the actuation tube and between the piston and the body so as to obtain a uniformity in the contacts between the annular surfaces of the base and of the piston and a better distribution of the pressure of the piston inside the body. This arrangement then makes it possible to improve the sealing of the piston and of the discharge valve and to limit the wear thereof.

Furthermore, because of the better sealing, the creation of the ball-and-socket joint between the insert and the actuation tube makes it possible to improve the capacities of the pump in terms of delivery of fluid product and priming, when the movement of the stem aims to expel the air initially contained upstream of the discharge valve, in particular in the metering chamber, in order to replace it with fluid product.

In particular, the vacuum that is created in the metering chamber when the stem travels from the near position to the far position is improved, which increases the capacity to aspirate fluid product or air, during priming.

The pump according to the invention may therefore be used with any type of fluid product, including viscous fluid products.

In particular embodiments, the pump may have, in a manner that may be complementary, one or more of the following arrangements:

- the insert also comprises a rod which extends from the base, substantially perpendicularly to said base, said rod being placed in an open end of the actuation tube situated near to the inlet orifice,
- the rod comprises a free end attached in an articulated manner to the inside of the actuation tube, an axial clearance and a transverse clearance being arranged between the insert and the actuation tube,
- the free end of the rod is provided with a head snap-fitted to an annular rim formed in the actuation tube,
- the annular surfaces of the piston and of the base have matching zones that are curved or inclined relative to the central axis,
- the piston comprises a central sleeve having a free end defining the annular surfaces of the piston, the base has a concavity turned toward the piston and in which the free end of the sleeve extends,
- the base is suitable for pinching the free end of the sleeve: such an interaction by pinching of the central sleeve of the piston and of the base makes it possible to increase and reinforce the contact between the annular surfaces and thereby ensure a good sealing of the discharge valve; the centering and the self-alignment between the insert and the actuation tube offers an appropriate relative positioning of the base and of the piston that can therefore ensure a controlled pinching so as to further improve the sealing of the discharge valve,
- the base comprises a central portion and a frustoconical peripheral collar which extends from the central portion, the central portion and the collar defining the annular surfaces of the base situated on either side of the free end of the sleeve,
- the base comprises an annular groove arranged in the concavity between the central portion and the collar: the groove may therefore improve the deformation capacity of the base to improve the pinching of the free end of the sleeve and ensure the sealing of the discharge valve,
- the base has a filling member suitable for occupying dead volumes of the metering chamber and for butting against a surface of the body in a near position of the stem: the aspiration capacity of the pump is thereby improved and prevents the piston from butting against the body so as to limit the wear of the piston, the base and the metering chamber in the vicinity of the inlet orifice have substantially matching shapes: in the near position, the volume of the chamber may therefore be minimal, the pump comprises an annular extender associated with the second end of the body and suitable for guiding the actuation tube in translation along the central axis, and an elastic member suitable for returning the stem to the far position, said elastic member being placed between the extender and the actuation tube: this arrangement makes it possible in particular to improve the compactness of the pump and prevent any risk of contamination of the fluid product by contact with the elastic member.

BRIEF DESCRIPTION OF THE DRAWINGS

Other objects and advantages of the invention will appear on reading the following description, made with reference to the appended drawings in which:

FIG. 1 is a representation in longitudinal section of a pump according to a first embodiment of the invention, FIG. 2 is a representation of the detail referenced 11 in FIG. 1, FIG. 3 is a representation in exploded perspective of the pump of FIG. 1, FIG. 4 is a representation in perspective of an actuation tube and an insert of the pump of FIG. 1, FIGS. 5*a*, 5*b* and 5*c* are representations in longitudinal section of steps of the actuation of the pump of FIG. 1, FIG. 6 is a representation in longitudinal section of a pump according to a second embodiment of the invention, FIG. 7 is a representation of the detail referenced VII in FIG. 6.

DETAILED DESCRIPTION OF THE INVENTION

Figures 10A, 10B, 10C:
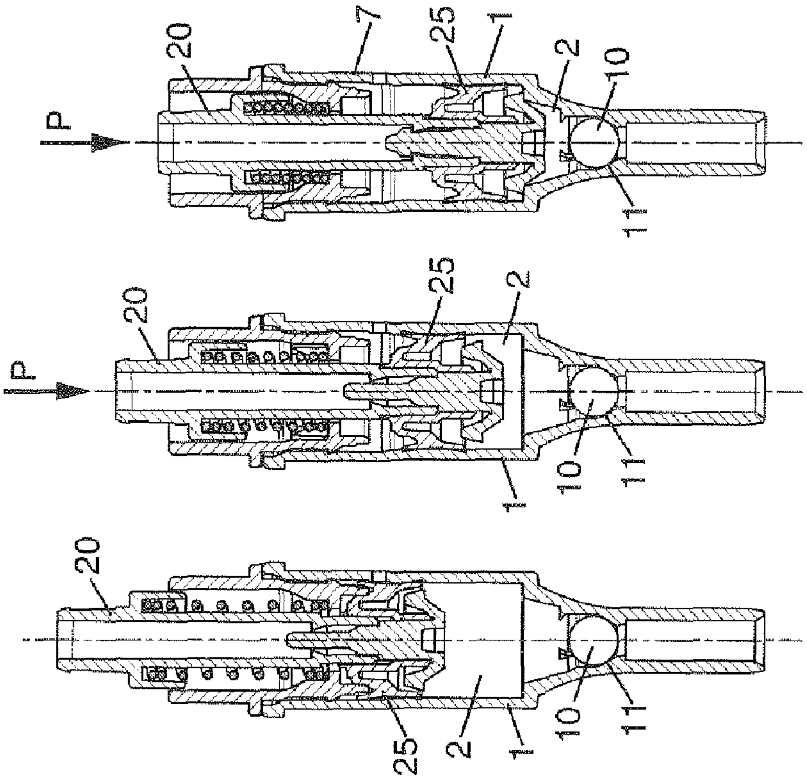
Figure 9:
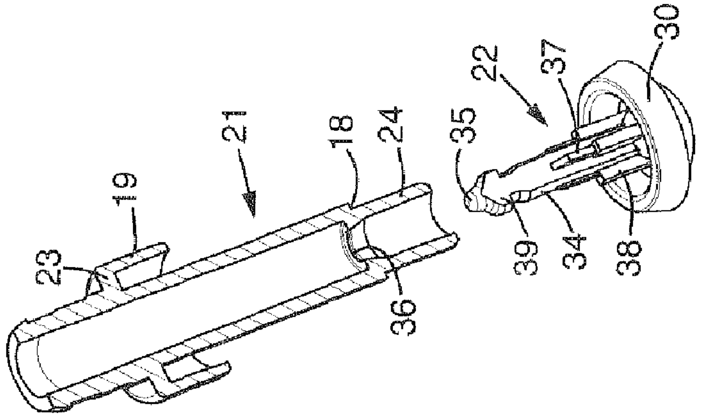
FIG. 9 is a representation of an actuation tube and an insert of the pump of FIG. 6, FIGS. 10*a*, 10*b* and 10*c* are representations in longitudinal section of steps of the actuation of the pump of FIG. 6.
Figure 8:
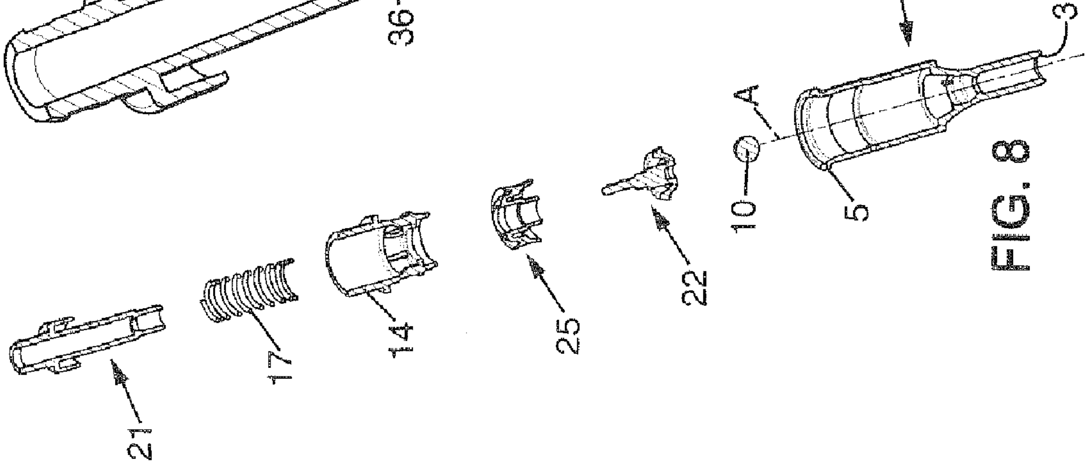
FIG. 8 is a representation in exploded perspective of the pump of FIG. 6.

In the figures, the same reference numbers indicate identical or similar elements.

The figures show a pump making it possible to deliver a fluid, liquid or viscous product, for example from the perfumery, pharmaceutical, cosmetic or other field. The pump comprises:

a tubular body 1 extending along a central axis A between a first end 3 and a second end 4, delimiting internally a metering chamber 2 of determined volume and comprising an inlet orifice 6 for the fluid product in the metering chamber 2 in the vicinity of the first end 3, a compression member mounted so as to slide along the central axis A inside the body 1 so as to be able to vary the volume of the metering chamber 2.

The pump is designed to be placed by the first end 3 of the body 1 in an opening of a reservoir, not shown, and attached in a manner known per se, for example by sleeve-fitting and/or by means of an attachment member, to the reservoir so as to be able to draw off a dose of fluid product contained in the reservoir.

In the rest of the description, the terms "upper" or "top" and "lower" or "bottom" will be understood in relation to the locations situated respectively near to the second end 4 of the body 1 and near to the first end 3 of the body 1. Furthermore, the terms "axial" or "longitudinal" and "radial" or "transverse" make reference to planes that are respectively parallel and perpendicular to the central axis A.

The body 1 comprises an annular side wall 7 in which the compression member is mounted. The side wall 7 has an internal surface, an external surface, an open upper end forming the second end 4 of the body 1, and a lower end.

In the figures, the internal surface of the side wall 7 of the body 1 may have a substantially circular section. The upper end 4 may have an annular rim 5 protruding outward whose internal surface has a diameter. The internal surface of the side wall 7 of the body 1 may also have a first portion adjacent to the rim 5 with a first diameter substantially less than the diameter of the rim 5 and a second portion, adjacent to the first portion on the opposite side to the rim 5, with a second diameter substantially less than the first diameter.

A through-hole forming a vent hole 8 may be arranged in the side wall 7 so as to allow air to pass between the outside and the inside of the reservoir to compensate for the dose of fluid product drawn off by the pump.

In the particular embodiments shown, provision is made for the body 1 also to be able to have an annular lower wall 9 which extends from the lower end of the side wall 7 and whose free end forms the first end 3 of the body 1, that is to say the lower end.

The lower wall 9 comprises internally the inlet orifice 6 and an inlet valve, for example a ball valve comprising a ball 10 and a seat 11, suitable for allowing the selective closing off of the inlet orifice 6, that is to say its opening, the ball 10 being moved away from the seat 11, or its closure, the ball 10 resting on the seat 11. Abutment members 12 may be provided opposite to and at a distance from the seat 11 to limit the movements of the ball 10.

The lower wall 9 may for example receive by sleeve-fitting a plunger tube, not shown, making it possible to place the metering chamber in fluidic communication with the reservoir.

According to the embodiments, the sleeve-fitting of the plunger tube may be made on an internal or external surface of the lower wall 9, said surface having a circular, elliptical, polygonal or other section. The free end of the lower wall 9 may then comprise an internal bevel 13*a* and/or an external bevel 13*b* so as to make the sleeve-fitting of the plunger tube easier. Furthermore, other arrangements concerning the surface on which the sleeve-fitting of the plunger tube is carried out may be provided to make the sleeve-fitting easier and/or to improve the retention of the plunger tube. In particular, provision may be made for said surface to have a section of variable dimension or at least a retaining protrusion.

The invention is not however limited in particular to a body 1 or a valve as described above. For example, the body 1 may have no lower wall 9, the lower end of the side wall 7 forming the first end 3 of the body 1, or may comprise an internal wall surrounded by the side wall 7, the valve and the inlet orifice 6 being adapted accordingly.

To close the upper end 4 of the body 1 and allow the compression member to be guided in translation along the central axis A, the pump also comprises an annular extender 14 associated with the upper end 4 of the body 1.

In the figures, the extender 14 may comprise an upper portion which protrudes relative to the upper end 4 of the body 1 and a lower portion which extends inside the side wall 7. The lower portion of the extender 14 may be associated with the internal surface of the side wall 7 of the body 1 by any known means, particularly sleeve-fitting, snap-fitting or other means. As a variant, provision may be made for the extender 14 to be associated with the external surface of the side wall 7 of the body 1.

Provision may be made for the extender 14 to comprise also a shoulder 15 protruding radially outward to rest on the rim 5 of the body 1 and a radial protrusion 16 that extends inward.

The compression member comprises:

a stem 20 mounted so as to be able to move axially inside the body 1 between a far position and a near position relative to the inlet orifice 6, an annular piston 25 mounted so as to slide axially inside the body 1 and on the stem 20.

The stem 20 comprises an elongated axial actuation tube 21 which delimits an outlet duct for the fluid product from the metering chamber to the outside, an elongated insert 22 assembled to the actuation tube 21 and an orifice for discharging the fluid product from the metering chamber 2 to the outlet duct.

The actuation tube 21 extends inside the extender 14 and comprises an open lower end, placed inside the body 1 and situated in the vicinity of the inlet orifice 6, and an open upper end, situated at a distance from the inlet orifice 6 and protruding relative to the upper end 4 of the body 1.

The upper end of the actuation tube 21 is suitable for allowing the attachment of an actuation member, such as a push button not shown, on which a user can exert a pressure to move the stem 20 from the far position to the near position.

In addition, provision is made for the stem 20 to be returned elastically to the far position. To do this, the actuation tube 21 has an annular edge 23 that extends outward and that is placed opposite to the radial protrusion 16 of the extender 14. An elastic member, for example a compression spring 17, extends between the edge 23 of the actuation tube 21 and the radial protrusion 16 of the extender 14.

The compression spring 17 thus placed around the actuation tube 21 outside the metering chamber 2 makes it possible to improve the compactness of the pump and prevent contact between the fluid product and the compression spring 17. It is however possible to provide, as a variant, any other appropriate arrangement of the compression spring 17, particularly outside the extender 14 or any other type of elastic member.

To guide the actuation tube in translation along the central axis A, an annular skirt 19 may extend axially from the free end of the edge 23 of the actuation tube 21. The skirt 19 of the actuation tube then has an external dimension, measured transversely, substantially equal to or less than the internal dimension, measured transversely, of the upper portion of the extender 14.

Furthermore, in the embodiments shown, the lower end of the actuation tube 21 delimits the discharge orifice defined by one or more passageways for discharging the fluid product to the outlet duct. The actuation tube 21 has, in the vicinity of the lower end, an end zone 24 of reduced transverse dimension. The end zone 24 on which the piston 25 is mounted so as to slide may be delimited in the upward direction by a shoulder 18.

The insert 22 comprises a base 30 which extends generally transversely relative to the central axis A and which is placed inside the metering chamber 2 and faces the inlet orifice 6. The base 30 may comprise a central portion 31 and a peripheral collar 32 which extends substantially transversely relative to the central axis A from the central portion 31.

The base 30 and the piston 25 comprise annular surfaces suitable for coming into mutual contact and forming a discharge valve 33 selectively closing off the discharge orifice when the piston 25 slides on the stem 20.

To allow the piston 25 to be mounted on the stem 20 having, on the one hand, the edge 23 and the shoulder 18 on the actuation tube 21 and, on the other hand, the base 30 on the insert 22, the actuation tube 21 and the insert 22 are two separate parts assembled after the piston 25 has been mounted on the actuation tube 21.

Furthermore, in the embodiments shown, the edge 23 is made in one piece with and of the same material as the actuation tube 21. The actuation tube 21 is then mounted in the extender 14 by the upper portion prior to the assembly of the compression member and to the mounting of the extender 14 on the body 1 of the pump. As a variant, provision is made for the edge 23 to be able to be fitted, the extender 14 then being able to be mounted after the assembly of the compression member.

For the relative positioning of the insert 22 and the actuation tube 21 to be able to ensure a sealed and uniform contact between the annular surfaces of the base 30 and of the piston 25 and a satisfactory pressure of the piston 25 on the body 1 of the pump, a ball-and-socket joint is made between the insert 22 and the actuation tube 21.

The ball-and-socket joint makes it possible to articulate, by means of a ball-and-socket or equivalent connection, the insert 22 and the actuation tube 21 so as to be able to orient the base 30 relative to the actuation tube 21, particularly angularly by means of rotations about three orthogonal axes, including the central axis A, or by means of a composition of said rotations.

The insert 22 may comprise a rod 34 which extends from a central portion 31 of the base 30 substantially perpendicularly to the latter. The rod 34 may comprise a free end, at the opposite end from the base 30, attached in an articulated manner to the inside of the actuation tube 21, an axial clearance Ja and a transverse clearance Jt being arranged between the insert 22 and the actuation tube 21.

For example, the free end of the rod 34 is provided with a head 35 snap-fitted onto an annular rim 36 formed inside the actuation tube 21. In the embodiments shown in the figures, the head 35 is conical and has a generally transverse and flat lower surface resting on a generally transverse and flat upper surface of the rim 36.

The insert 22 may comprise members for centering relative to the internal surface of the actuation tube 21. The centering members are suitable for leaving the transverse clearance Jt between the insert 22 and the actuation tube 21. In the figures, the centering members comprise evenly distributed longitudinal fins 37 that extend from the rod 34 of the insert 22 in the direction of the internal surface of the actuation tube 21.

The insert 22 may also comprise abutment members facing the lower end of the actuation tube 21 with an axial clearance Ja between the insert 22 and the actuation tube 21. In the figures, the abutment members comprise evenly distributed longitudinal lugs 38 which extend between the fins 37 and the base 30.

The fins 37 and the lugs 38 make it possible to limit the movements of the insert 22 relative to the actuation tube 21.

The fins 37 and the lugs 38 also make it possible to arrange passageways for the fluid product between the insert 22 and the actuation tube 21.

In the first embodiment shown in FIGS. 1 to 5, the passageways are formed between the fins 37, on the one hand, and between the head 35 and discontinuities arranged in the rim 36, on the other hand.

As a variant not shown, it is however possible to provide that the rim 36 is continuous and comprises no discontinuity. The passageways for the fluid product may then be created by a space formed between the rod 34 and the rim 36, for example because of a difference between the external diameter of the rod 34 and the internal diameter of the rim 36.

In the second embodiment shown in FIGS. 6 to 10, the head 35 rests on the rim 36 which may be continuous. Flats 39 may then be arranged on the head 35 and extend along the rod 34 to form the passageways.

As a variant not shown, the rim 36 may have discontinuities.

The combination of the snap-fitting of the head 35, the axial clearance Ja and the transverse clearance Jt forms a connection equivalent to a ball-and-socket connection and makes it possible to arrange, in addition to the ball-and-socket joint, an axial range of movement between the insert 22 and the actuation tube 21.

However, in other embodiments not shown, it is possible to provide for the contact surfaces of the head 35 and of the rim 36 to be curved or inclined relative to a transverse plane. In addition, the embodiment of the ball-and-socket joint is not limited to the embodiment described above. The head 35 of the rod 34 may for example be spherical and placed in a matching housing formed on the actuation tube 21.

Furthermore, the figures represent a stem 20 in which the lower end of the actuation tube 21 delimits, with the insert 22 having a solid rod 34, the substantially axial discharge orifice. As a variant, the discharge orifice may be arranged transversely in the actuation tube 21. According to another variant, the insert may comprise a hollow rod 34 which delimits a lower portion of the outlet duct, the discharge orifice being able to be provided transversely on the hollow rod or on the actuation tube 21.

The piston 25 is suitable for pressing in a sealed manner against the internal surface of the side wall 7 of the body 1 and in contact with the annular surfaces of the base 30.

In particular, the piston 25 may comprise a central sleeve 26 mounted so as to slide on the end zone 24 of the actuation tube 21 between the shoulder 18 and the base 30, the distance between the shoulder 18 and the base 30 being suitable for obtaining a sufficient opening of the discharge valve 33. As a variant, if the insert 22 comprises a hollow rod 34, provision could be made to mount the piston 25 on the insert 22.

The central sleeve 26 may have a lower free end defining the annular surfaces coming into contact with the annular surfaces of the base 30. The annular surfaces of the piston 25 and the annular surfaces of the base 30 defined by the central portion 31 and the collar 32 may have matching zones that are curved or inclined relative to the central axis A.

In addition, the base may have a concavity that is turned toward the piston 25 and in which the free end of the sleeve 26 extends. In this manner, the base 30 may be suitable for pinching the free end of the sleeve 26.

For example, the central portion 31 may have an external surface and the collar 32 extending from the external surface of the central portion 31 may be frustoconical widening out upward. The free end of the sleeve 26 may then, with an internal zone, come into contact on a first zone of the external surface of the central portion 31 and, with an external zone, come into contact on a second zone of the upper surface of the collar 32.

In the figures, the internal zone of the free end of the sleeve 26 and the first zone of the central portion 31 are substantially axial and the external zone of the free end of the sleeve 26 and the second zone of the central portion 31 are substantially inclined relative to axial and transverse directions. However it is possible to provide, as a variant, other suitable orientations of the zones of the free end of the sleeve 26, of the central portion 31 and of the collar 32.

The annular surfaces of the base 30 may therefore be situated on either side of the free end of the sleeve 26 to pinch the free end of the sleeve 26 and therefore improve the sealing of the contact between the base 30 and the piston 25. With the ball-and-socket joint, the centering and self-alignment of the insert 22 and of the actuation tube 21 and a positioning that is better suited to the annular surfaces of the base 30 on either side of the free end of the sleeve 26 are obtained so that the sealing of the discharge valve 33 is further improved.

In addition, in the first embodiment, the base may comprise an annular groove 29 arranged in the concavity between the central portion 31 and the collar 32 to obtain better flexibility for the collar 32, helping with the pinching of the free end of the sleeve 26 between the central portion 31 and the collar 32.

The piston 25 may also comprise an axial annular tubular casing 27 surrounding the central sleeve 26 and connected to the latter by a substantially radial wall. The tubular casing 27 defines an upper lip and a lower lip which come into friction contact with the internal surface of the side wall 7 of the body 1.

In the embodiments shown, to limit the wear of the piston and the stresses on the upper lip, provision is made that, in the far position of the stem 20, the upper lip is placed against the first portion of the side wall 7 of the body 1. Furthermore, the lower lip is placed against the second portion of the side wall 7 of the body 1 so that the metering chamber 2 is delimited radially by the second portion of the side wall 7. In addition, in the far position of the stem 20, the vent hole 8 is placed between the upper and lower lips.

However, as a variant, the piston 25 may comprise only one lip pressing on the body 1, the arrangement of the vent hole 8 being adapted accordingly to put the inside of the reservoir in fluidic communication with the outside when the stem 20 travels from the near position to the far position.

With reference to FIGS. 5*a*, 5*b* and 5*c* and 10*a*, 10*b* and 10*c*, the various steps of actuation of the pump by a user are described.

In the absence of external pressure, the stem 20 is urged by the compression spring 17 toward its far position (FIGS. 5*a* and 10*a*). Because of the ball-and-socket joint and the force of the compression spring 17, the insert 22 aligns itself relative to the actuation tube 21. The piston 25 is in abutment with its radial wall on the extender 14 and the free end of the central sleeve 26 rests against the base 30 to close the discharge valve 33. In the present embodiments, the free end of the sleeve 26 is pinched between the central portion 31 and the collar 32 of the base 30. Furthermore, the inlet valve is closed.

In the embodiments shown, provision is made for the force of friction between the piston 25 and the body 1 to be greater than the force of friction between the piston 25 and the stem 20. When the user exerts a pressure P, by means for example of a push button, on the actuation tube 21, because of the difference between the forces of friction, the actuation tube 21 slides relative to the piston 25, so as to open the discharge valve 33 until the central sleeve 26 butts against the shoulder 18 of the actuation tube 21.

Then, the movement of the actuation tube 21 causes the piston 25 to move toward the inlet orifice 6 (FIGS. 5*b*, 10*b*). The movement of the stem 20 may be continued until the stem 20 reaches the near position. The inlet valve is closed.

When the user relaxes the pressure P on the push button, the compression spring 17 urges the actuation tube 21 toward the far position and, because of the difference of the forces of friction, the actuation tube 21 slides relative to the piston 25 until the central sleeve 26 comes into contact with the base 30 and closes the discharge valve 33. The rise of the stem 20 is then accompanied by the rise of the piston 25 in the body 1 and therefore by an increase in the volume of the metering chamber 2. A vacuum is created in the metering chamber 2, which causes the inlet valve to open, the ball 10 being offset relative to the seat 11, and the product to be aspirated into the metering chamber 2.

In other embodiments, provision could be made to control the opening and closure of the inlet valve with the aid of an elastic member such as a pre-compression spring.

In a priming phase, the movement of the stem from the far position to the near position makes it possible, when the metering chamber 2 is full of air, before the first use, to expel the air in order to replace it with fluid product.

To ensure a rapid priming of the pump and improve the aspiration capacities of the pump, the base 30 has a filling member, for example in the form of a ring 40 made of the same material as and in one piece with the free end of the collar 32, suitable for occupying the dead volumes of the metering chamber 2. In particular, the ring 40 may extend into a volume between the central sleeve 26 and the tubular casing 27. It is also possible to provide that the ring is suitable for butting against a surface of the body 1 in the near position of the stem 20 in order to prevent applying stresses on the tubular casing 27 in the near position.

To improve the capacities of the pump in terms in particular of priming or delivery of the fluid product, provision may be made for the base 30 and the metering chamber 2 in the vicinity of the inlet orifice 6 to have substantially matching shapes so as to reduce the volume of the metering chamber 2 in the near position of the stem 20.

What is claimed is:

1. A pump for delivering a fluid product comprising:

a tubular body extending along a central axis between a first end and a second end, delimiting internally a metering chamber and comprising an inlet orifice for the fluid product in the metering chamber in the vicinity of said first end, an inlet valve suitable for selectively closing off the inlet orifice, a stem mounted so as to be able to move axially inside the tubular body between a far position and a near position relative to the inlet orifice, said stem being returned elastically to the far position, said stem comprising an elongated axial actuation tube delimiting an outlet duct, an elongated insert assembled to the actuation tube and comprising a base placed inside the metering chamber and facing the inlet orifice, and an orifice for discharging the fluid product to the outlet duct, the insert comprising a rod which extends from the base, substantially perpendicularly to said base, said rod being placed in an open end of the actuation tube situated near to the inlet orifice, an annular piston mounted so as to slide axially inside the tubular body and on the stem, the piston and the base comprising annular surfaces suitable for coming into mutual contact and forming a discharge valve selectively closing off the discharge orifice, wherein the insert is movably attached to the actuation tube through a ball-and-socket joint arranged between the insert and the actuation tube, the insert being moveable with respect to the actuation tube in rotations about three orthogonal axes including the central axis, the rod of the insert comprising a free end attached in an articulated manner to the inside of the actuation tube, the insert comprising evenly distributed centering members which extend from the rod in the direction of an internal surface of the actuation tube with a transverse clearance arranged between each centering member and the internal surface of the actuation tube, an axial clearance being arranged between the insert and the actuation tube, the transverse and axial clearances being arranged to form the ball-and-socket joint.

2. The pump as claimed in claim 1, wherein the free end of the rod is provided with a head snap-fitted to an annular rim formed in the actuation tube.

3. The pump as claimed in claim 1, wherein the annular surfaces of the piston and of the base have matching zones that are curved or inclined relative to the central axis.

4. The pump as claimed in claim 3, wherein the piston comprises a central sleeve having a free end defining the annular surfaces of the piston, the base has a concavity turned toward the piston and in which the free end of the central sleeve extends.

5. The pump as claimed in claim 4, wherein the base is suitable for pinching the free end of the central sleeve.

6. The pump as claimed in claim 5, wherein the base comprises a central portion and a frustoconical peripheral collar which extends from the central portion, the central portion and the frustoconical peripheral collar defining the annular surfaces of the base situated on either side of the free end of the central sleeve.

7. The pump as claimed in claim 6, wherein the base comprises an annular groove arranged in the concavity between the central portion and the frustoconical peripheral collar.

8. The pump as claimed in claim 1, wherein the base has a filling member suitable for occupying dead volumes of the metering chamber and for butting against a surface of the tubular body in a near position of the stem.

9. The pump as claimed in claim 1, wherein the base and the metering chamber in the vicinity of the inlet orifice have substantially matching shapes.

10. The pump as claimed in claim 1, comprising an annular extender associated with the second end of the tubular body and suitable for guiding the actuation tube in translation along the central axis, and an elastic member suitable for returning the stem to the far position, said elastic member being placed between the extender and the actuation tube.

* * * * *